United States Patent
Beetz et al.

[19]

[11] Patent Number: 6,093,909
[45] Date of Patent: *Jul. 25, 2000

[54] FLOW HEATER

[75] Inventors: Klaus Beetz, Karlsruhe; Franz Bohlender, Kandel, both of Germany

[73] Assignee: David & Baader - DBK - Spezialfabrik elektischer Apparate und Heizwiderstande GmbH, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/134,608

[22] Filed: Aug. 14, 1998

[30] Foreign Application Priority Data

Aug. 29, 1997 [EP] European Pat. Off. ............. 97115039

[51] Int. Cl.⁷ ..................................................... B60L 1/02
[52] U.S. Cl. .......................................... 219/208; 219/202
[58] Field of Search .................................. 219/208, 202, 219/305, 441; 123/548; 239/284.1; 165/164; 392/484, 480; 236/34.5

[56] References Cited

U.S. PATENT DOCUMENTS

| | | | |
|---|---|---|---|
| 3,943,325 | 3/1976 | Pickard | 219/208 |
| 4,177,375 | 12/1979 | Meixner | 219/441 |
| 4,508,957 | 4/1985 | Rocchitelli | 219/305 |
| 5,239,163 | 8/1993 | Brouwers | 219/202 |
| 5,256,857 | 10/1993 | Curhan et al. | 219/202 |
| 5,354,965 | 10/1994 | Lee | 219/202 |
| 5,385,296 | 1/1995 | Kurz et al. | 236/34.5 |

FOREIGN PATENT DOCUMENTS

| | | | |
|---|---|---|---|
| 0 019 376 | 11/1980 | European Pat. Off. | |
| 0 282 085 | 3/1988 | European Pat. Off. | |
| 2 634 090 | 7/1988 | France | |
| 0025916 | 4/1981 | Germany | |
| 29 48 591 A1 | 6/1981 | Germany | |
| 38 10 051 | 10/1989 | Germany | |
| 19530609A | 2/1997 | Germany | B60H 1/00 |
| 07272737A | 7/1995 | Japan | H01M 8/04 |

*Primary Examiner*—Teresa Walberg
*Assistant Examiner*—Quang Van
*Attorney, Agent, or Firm*—Michael Best & Friedrich LLP

[57] ABSTRACT

The invention relates to a flow heater for heating liquid in a closed cycle in a motor vehicle. The flow heater comprises at least one radiator with at least one channel, through which the liquid to be heated flows, ant at least one PTC-heating element for heating the closely adjacent radiator.

20 Claims, 5 Drawing Sheets

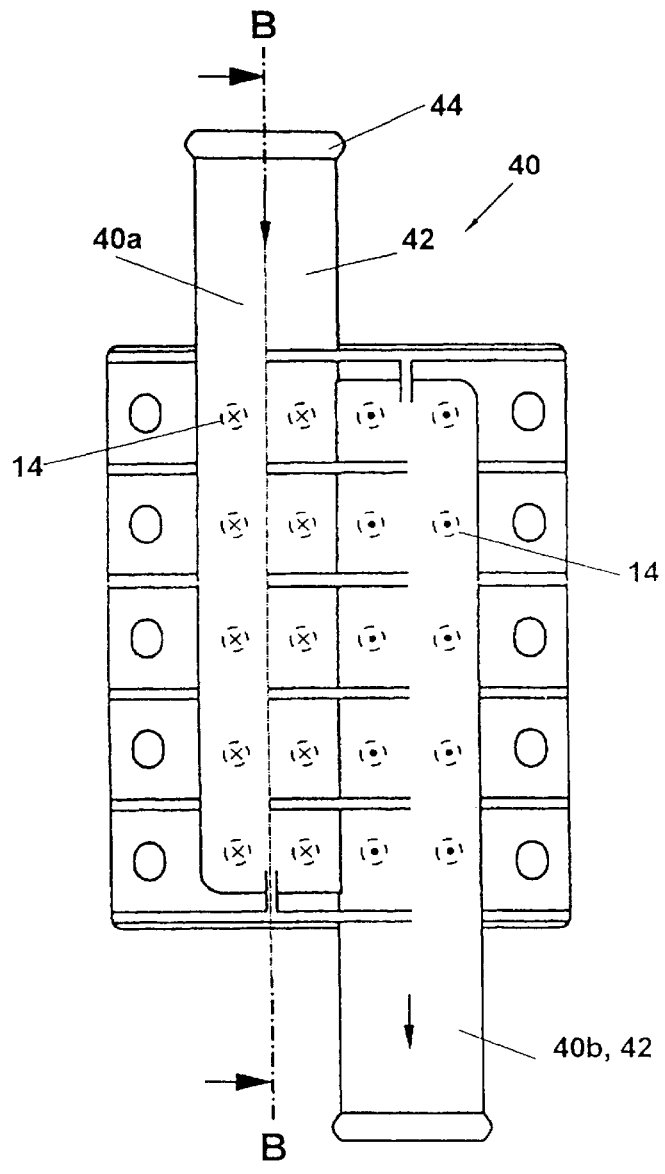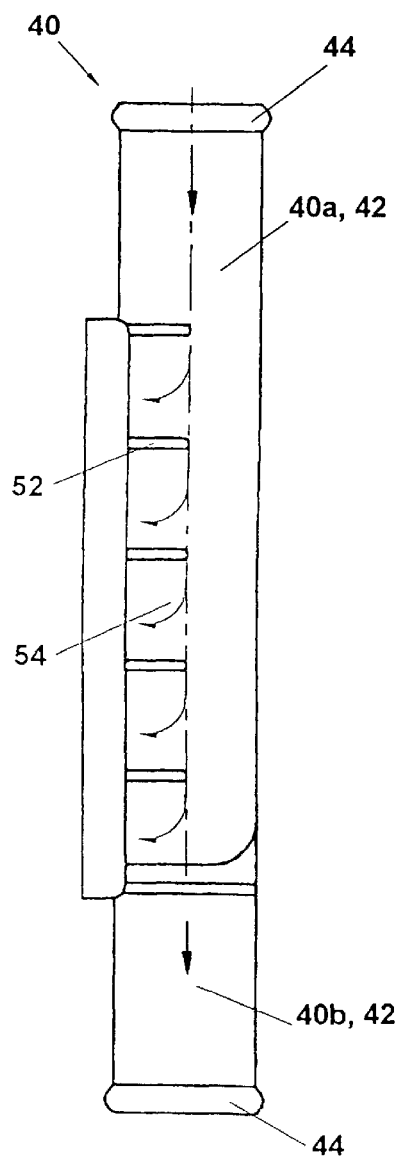
Fig. 5
Fig. 6

FLOW HEATER

BACKGROUND OF THE INVENTION

The present invention relates to a flow heater for heating the liquid in a closed cycle in a motor vehicle according to the preamble of claim 1.

Besides emitting fuel heaters there are emission-free alternatives available for heating the interior of motor vehicles. These are particularly interesting for the installation in "no emission" electric motor vehicles. Among emission-free heating concepts are a heat pump, which uses the heat generated by the compression of cooling agents, or a PTC-air heating.

DE 44 36 791 A1 discloses a PTC-air heating for the use in motor vehicles, in which the air flows past heated corrugates ribs and is heated thereby. The corrugated ribs serve as heat exchangers and are heated by a warm liquid and/or by PTC-heating elements.

An alternative is the exclusive heating of the heat exchanger with heated cooling liquid from a cooling cycle provided in the motor vehicle. However, often the temperature of the cooling liquid heated by the cooling of the vehicle motor is not sufficient for heating the air flowing through the heat exchanger in a sufficiently rapid manner. Therefore, an additional heating of the cooling liquid is required before it flows through the heat exchanger. To this end, the cooling liquid is heated in an upstream flow heater by directing the cooling liquid through radiators which are heated by means of electrical heating elements.

In the known flow heaters of this type the heating elements are provides as resistor heating elements. They have extremely high temperatures at the heating source (spiral wound filament, heating spiral) which may cause an overheating of adjacent parts, if the temperature of the heating source is not controlled or monitored. To avoid thermal damages caused through the temperatures of these heating sources that are significantly above the temperature of the liquid to be heated the heating source and the radiators to be heated by the same are arranged with a distance to each other. However, this causes heat losses and increased dimensions for the flow heater.

SUMMARY OF THE INVENTION

It is an object of the present invention to provide a flow heater which is improved with regard to safety and energy loss.

This object is solved by the flow heater comprising the features of claim 1.

The particularity of the flow heater according to the invention is the use of a PTC-heating element for heating the radiator. PTC-heating elements have a positive temperature coefficient (PTC), i.e. their resistance increases with the heat, so that an increasing temperature causes a decreasing heating power. This self-controlling mechanism causes the PTC-element to stabilize its temperature by itself, so that predetermined limit temperatures will not be exceeded.

These characteristics of the PTC-heating element are the basis for numerous advantages of the flow heater according to the invention.

The temperature-stabilizing control behavior of the PTC-heating element contributes significantly to its own safety and therefore to the safety of the flow heater, since the predetermined limit temperatures will not be exceeded even when there occurs a dry run or in case of a failure. In contrast to the prior art this safety is provided automatically by the PTC-heating element, i.e. without any additional space consuming, cumbersome and costly monitoring of the temperature of the heat source.

Furthermore, the usual operating temperatures of the PTC-heating element are not excessively above the temperature of the liquid to be heated compared to the prior art. This allows and requires a place-saving close vicinity of the PTC-heating element to the radiator for securing in this manner a good heat transmission with a correspondingly low heat loss.

Furthermore, the low operating temperatures of the flow heater, which even in a failure does not heat the immediate environment to more than 100° C., allow its installation in a inexpensive and light-weighted plastic housing. The compact construction and the relatively low weight makes the flow heater of this invention not only suitable for the use in motor vehicles comprising combustion engines but also for the use in electric motor vehicles, in particular because the latter also usually comprise a liquid cycle for cooling their batteries.

In a preferred embodiment the radiators in the flow heater are provided as extruded profiles, which allows a inexpensive mass production of endless radiators.

Preferably, a heating element comprises a plurality of PTC-resistors that are arranged between two plane-parallel metallic electrodes and connected in parallel. This configuration is space-saving and allows for the compensation of manufacturing tolerances of the PTC-resistors, with the electrodes furthermore providing a large area heat transmission to the radiators to be heated.

Furthermore, it is an advantage to closely stack alternatingly a radiator and a PTC-heating element on top of each other. This arrangement in layers is not only very compact but additionally provides for a very good heat dissipation across the layers, because a large surface of each PTC-heating element is contacted by two radiators which are thereby heated simultaneously.

In another preferred embodiment the flow heater comprises a control means for controlling the temperature of the liquid to be heated. For this purpose, the control means is provided such that individual heating elements may be turned on and off corresponding to the desired heating power.

The use of the PTC-heating element is advantageous because the flow heater may be employed without an lossy upstream voltage divider for broad voltage ranges of about 100V–400V.

The front sides of the layered radiators are preferably closed with a cover in such a manner that the internal channels are easily connected to a communicating channel system.

In a preferred embodiment the used covers are made out of plastics, which is only possible because of the low operating temperatures of the flow heater. Plastics is advantageous because is has low weight and may be inexpensively produced in mass manufacturing.

Finally, if one of the covers is provided as a liquid terminal and the other one is provided as a electric terminal for the flow heater, the two terminal may be spatially separated. This terminal configuration contributes substantially to the operating safety of the flow heater.

A preferred embodiment of the present invention will be described with reference to the accompanying drawings.

IN THE DRAWINGS

FIG. 5 shows a cover of the flow heater comprising liquid terminals;

FIG. 6 is a section view along line B—B in FIG. 5 through the cover of the flow heater with liquid terminals.

DETAILED DESCRIPTION OF THE PREFERRED EMBODIMENT

Figure 1:
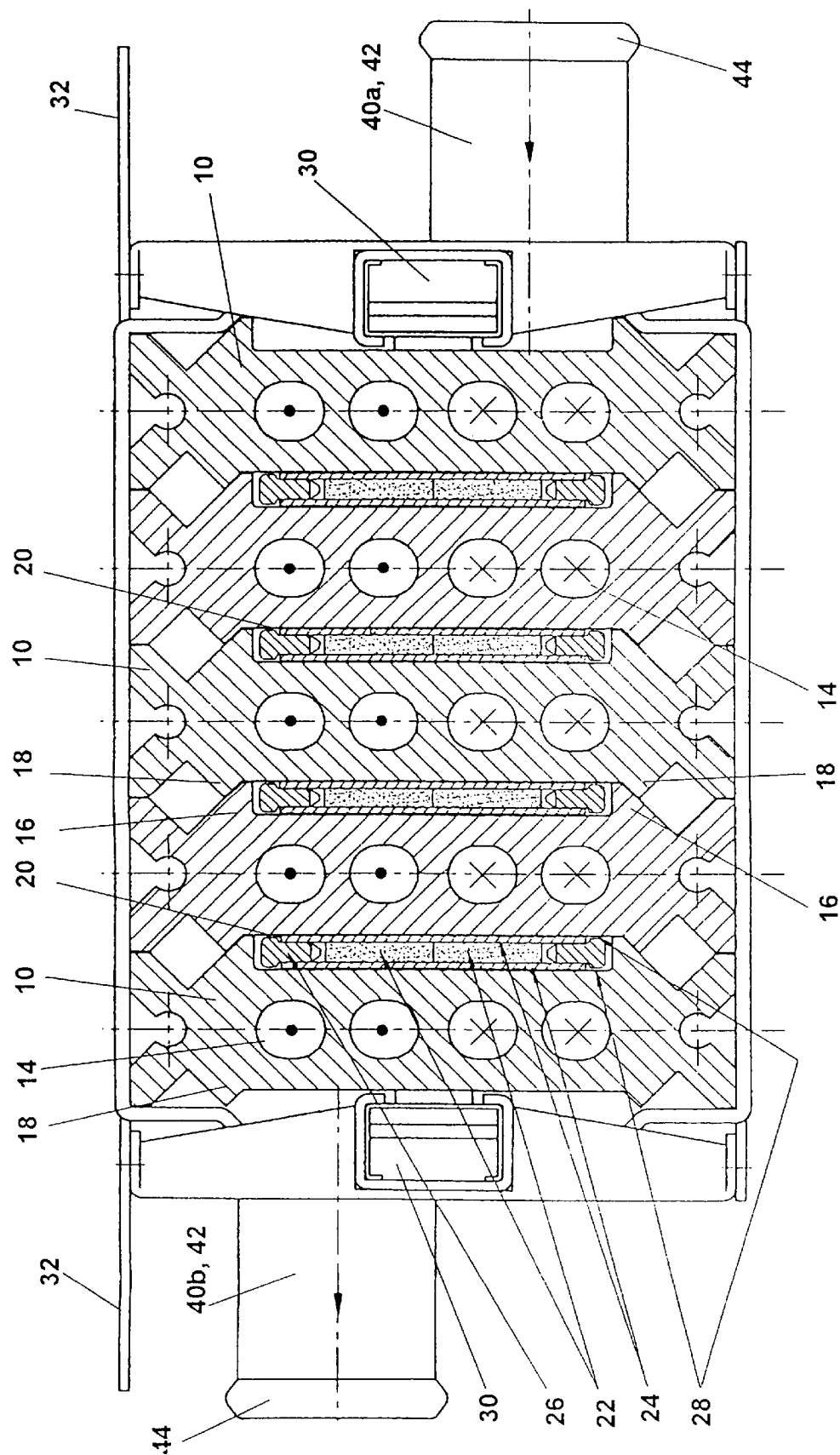
FIG. 1 is a cross-section view along line A—A in FIG. 2 through a flow heater with five radiators.

FIG. 1 shows a flow heater with five modularly connected radiators 10 and four PTC-heating elements 20 interposed between the radiators. Each radiator is an extruded profile made out of heat conducting aluminum. This profile has four parallel channels 14 in the longitudinal direction which are in a plane and through which in operation the liquid to be heated flows. Also in the longitudinal direction and in parallel to the plane of the channels there is provided a rectangular groove on one side of each extruded profile for the fitting reception of a PTC-heating element 20. The groove is restricted on both sides by profile wedges 16 of the extruded profile.

When stacking two extruded profiles the protruding profile wedges 16 of the first extruded profile fittingly engage into the corresponding profile contours 18 of the adjacent surface of a second extruded profile, ensuring an exact positioning of two adjacent extruded profiles with regard to each other. The described positioning provides furthermore for a closing of the groove of the first extruded profile through the second extruded profile, so that there remains respectively a rectangular hollow space between two adjacent radiators for the fitting reception of a PTC-heating element 20.

Each PTC-heating element 20 comprises twelve PTC-resistors 22, which are connected in parallel through two plane-parallel aluminum electrodes 24. Since the dimensions of the hollow space between two adjacent radiators are chosen for the fitting reception of a PTC-heating element a large area heat contact between the aluminum electrodes and the adjoining radiators is provided. Adjacent to the aluminum electrodes 24 a positioning frame 26 extends along the edges of the aluminum electrodes and forms an outer boundary of the PTC-heating element. The positioning frame is formed in a such a manner that it engages between the closely spaced aluminum electrodes and at the same time borders the sides of the same with a flush ending, circumferential bead.

The PTC-heating elements are available in two types with nominal voltages of 120V (voltage range 90V–240V, permissible maximal voltage 500V) and 300V (voltage range 180V–400V, permissible maximal voltage 800V). In order to achieve an electrical insulation the PTC-heating elements are coated with a thin insulating film 28, e.g. in a green film.

Figure 2:
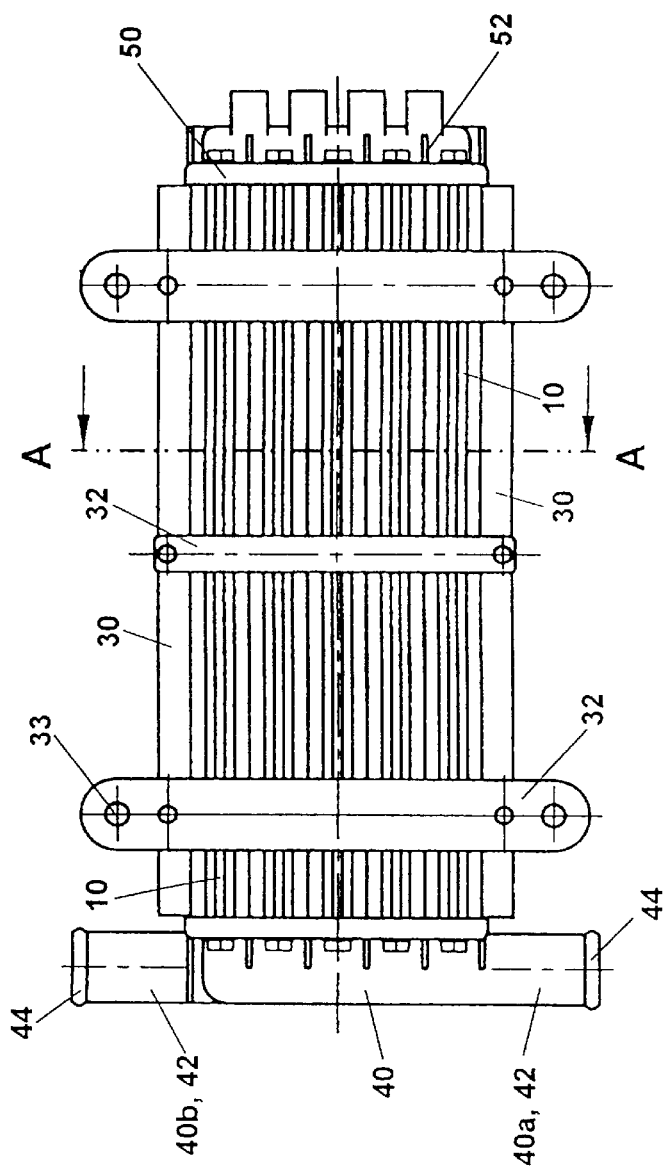
FIG. 2 is an elevational section view through the flow heater with five radiators.
Figure 3:
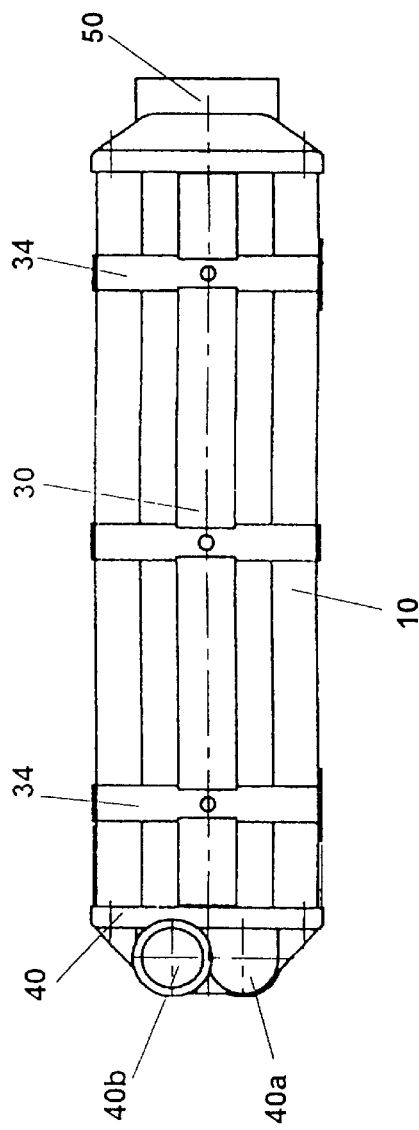
FIG. 3 is a plan view of the flow heater.

In the following reference is made to FIGS. 2 and 3 which show a longitudinal section through the flow heater and a top view. The radiators 10 are held together by a plurality of brackets 32 and horizontal crossheads 34, with two opposing brackets and two opposing crossheads forming a closed collar which fully encompasses the radiators. Three such collars are distributed along the length of the radiators. For ensuring a tolerance free contact between the radiators even with possibly existing manufacturing inaccuracies the radiators are held together inside of the collar enclosing by two spring shackles at light pressure. The two outer ones of the three brackets 32 project on one side of the flow heater extending above and below the height of the stacked radiator and comprise a bore 33 respectively in these projecting parts that allow the mounting of the flow heater in for example the engine compartment of a motor vehicle.

On opposing open fronts of the radiators there are two covers 40, 50 which connect the initially not communicating channels 14 of all extruded profiles in the flow heater to a communicating channel system between the two liquid terminals 40*a* and 40*b* provided in the cover 40.

Figure 4:
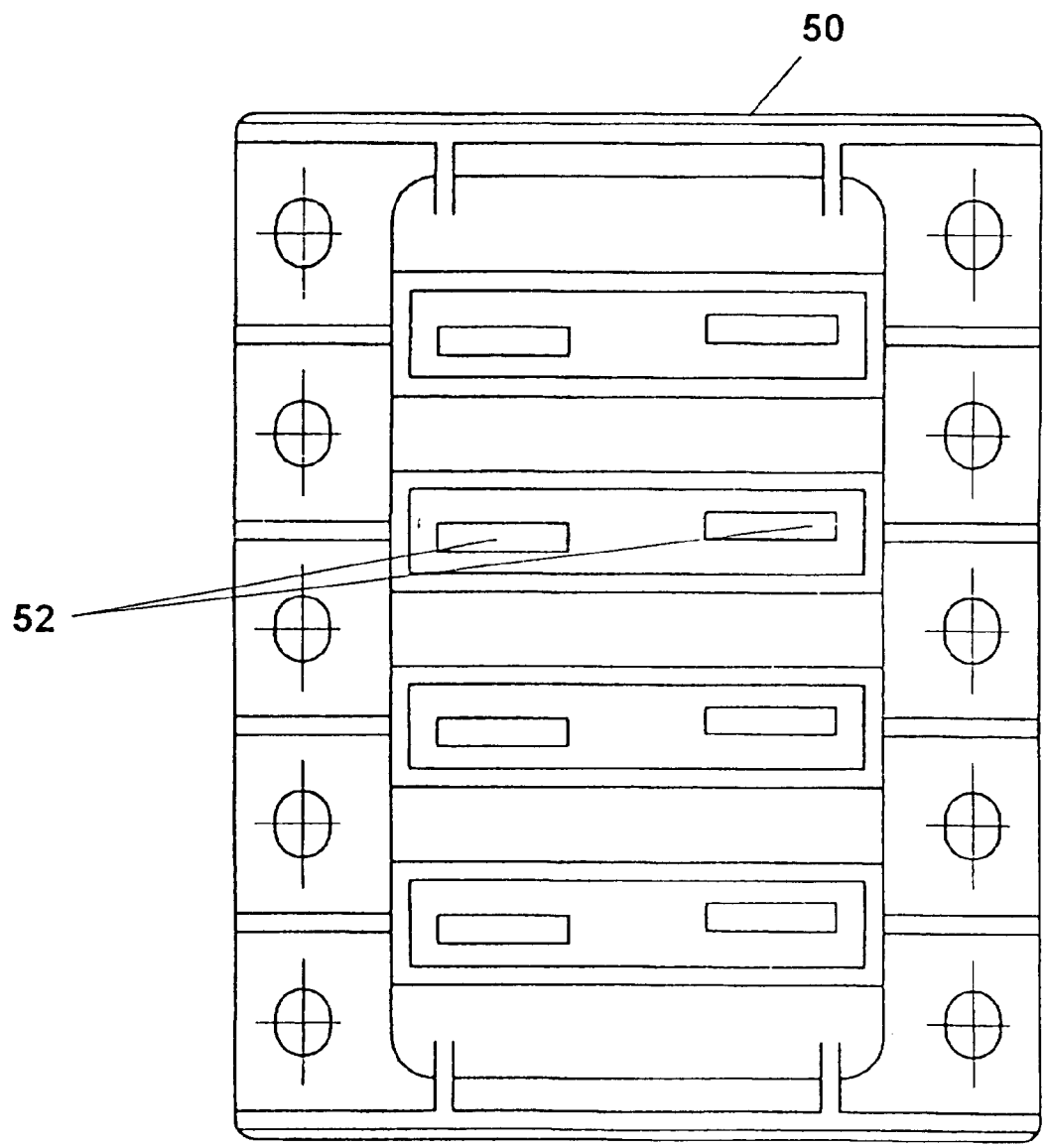
FIG. 4 shows a cover of the flow heater comprising electrical terminals.

FIG. 4 shows the cover 50 with the electrical terminals 52. The two electrical terminals of each PTC-heating element extend in pairs towards the outside, so that each PTC-heating element may individually be turned off and on.

FIGS. 1, 5 and 6 illustrate the flow path of the liquid to be heated in the channel system, with the flow direction at the channels 14 indicated with a cross going into the plane of the drawing and the flow direction at the channels indicated with a point going out of the plane of the drawing. The liquid to be heated initially enters the flow heater through a terminal piece 42 of the liquid inlet terminal 40*a*. As shown in FIGS. 5 and 6 it flows from there into the channels 14 respectively arranged in pairs of all the radiators 10 present in the flow heater.

For enhancing the flow conditions the liquid inlet terminal 40*a* has partition walls 52 in its interior. These are arranged parallel behind each other in the flow direction at the height of the interface between the radiators. These partition walls form chambers 54 above the channels opposing the central part of the flow heater and cause that the liquid streaming in is uniformly distributed over all radiators.

From the cover 40 the liquid flows through the channels 14 towards the cover 50 by which it is re-directed to the remaining pair of the four liquid channels 14 of each extruded profile. After the re-direction the liquid flows back to the cover 40 where it exits again through the liquid outlet terminal 40*b*.

The liquid outlet terminal 40*b* has a configuration corresponding exactly to the described liquid inlet terminal 40*a*. The terminal pieces 42 of both liquid terminals 40*a* and 40*b* comprise a bead 44 at their inlet and outlet opening, respectively, for preventing the slipping of the connecting hoses of the closed cooling cycle.

During operation the radiators 10 are heated by the PTC-heating elements 20, so that the liquid will be heated while flowing through the radiator. Using a control means the PTC-heating elements may be individually turned on and off, so that the temperature of the liquid flowing through the flow heater can be adjusted stepwise to the desired heating power.

Figure 7:
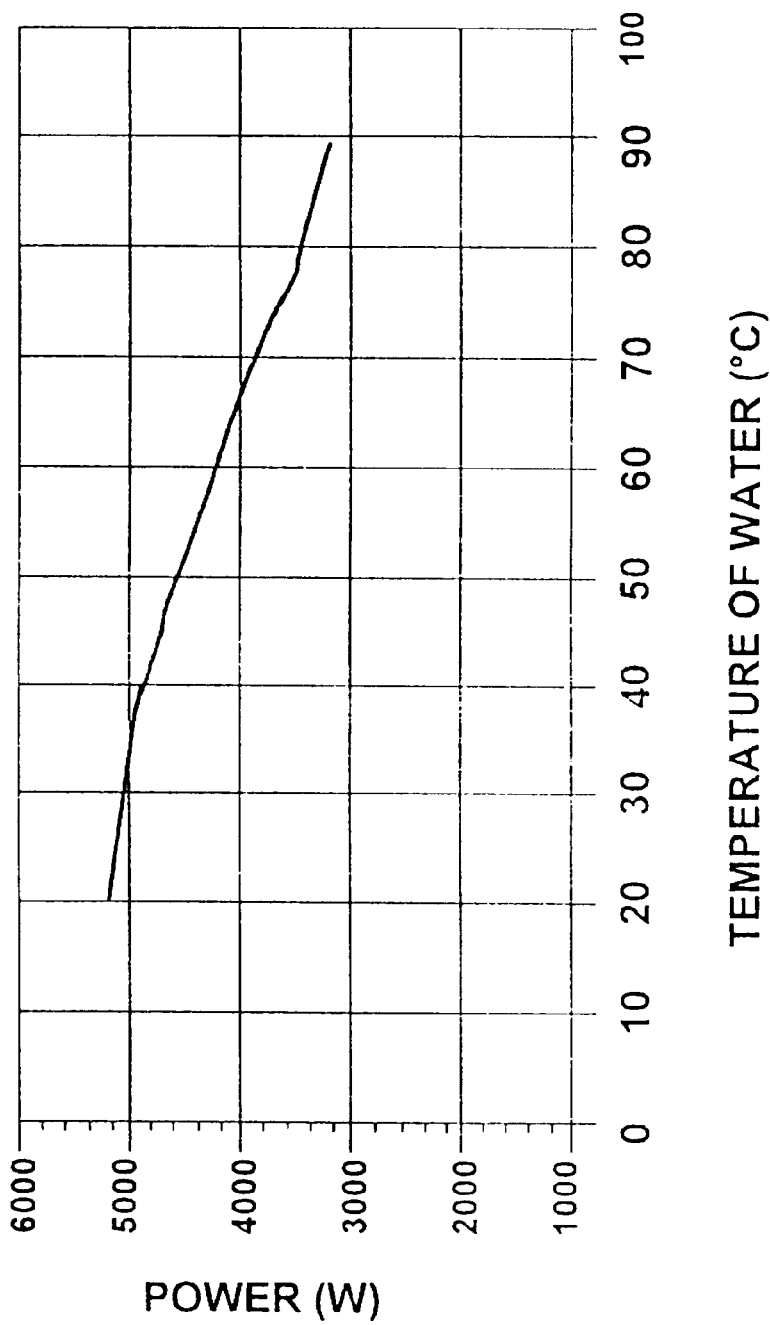
FIG. 7 is a diagram, which shows the heat power of the flow heater as a function of the temperature of the entering liquid.

Finally reference is made to FIG. 7 which illustrates in a diagram the relation between the electrical heating power in kW of the PTC-heating elements in the flow heater and the temperature in ° C. of the cooling liquid. It can be seen, that at start of travel, when the temperature is for example 30° C., there is a heating power of 5.1 kW available, which enhances a rapid heating of the cooling liquid. On the other hand, if the motor runs hot during longer travels and the temperature of the cooling liquid rises to 80° C. the resistance of the PTC-heating elements increases because of the typical PTC-behavior, which results in a decrease of the heating power to 3.5 kW, thus automatically stabilizing the temperature of the cooling liquid at any time.

What is claimed is:

1. A heating system in a vehicle, said heating system comprising:

a heating device for heating a heat-transfer agent, said heat-transfer agent circulating in a coolant cycle, said coolant cycle including a heat exchanger for heating, said heating device comprising a plurality of heat conductive members being stacked and a plurality of channels through which the heat-transfer agent flows, the front sides of said stacked heat conductive members being closed with a cover in such a manner that said channels are connected to a communicating channel system, said plurality of heat conductive members being arranged closely adjacent to a heating element, said heating element being a PTC (Positive Temperature Coefficient) heating element.

2. A heating system according to claim 1, wherein said heat conductive member is provided as an extruded profile.

3. A heating system according to claim 1, wherein said PTC heating element comprises a plurality of PTC thermistors, said thermistors being arranged between plane-parallel metallic electrodes and being connected in parallel.

4. A heating system according to claim 1, wherein a plurality of heat conductive members are arranged adjacently to each other, with a PTC heating element being arranged between each two heat conductive members.

5. A heating system according to claim 1, wherein said heat-transfer agent has a temperature, and said heating device comprises a control means for controlling the temperature of said heat-transfer agent, said control means being capable of individually turning on and off said PTC heating element.

6. A heating system according to claim 1, wherein said PTC heating element is operable in a voltage range of 100V–400V, and produces a heat output of 800W.

7. A heating system according to claim 1, wherein said cover consists of plastic.

8. A heating system according to claim 1, further comprising a second cover, one of the two covers being provided with connecting fittings for supplying said heat-transfer agent, and the other cover being provided with an electrical terminal for supplying electric power to said PTC heating element.

9. A heating system according to claim 1, for heating a passenger compartment of said vehicle.

10. A heating system according to claim 1, wherein said vehicle is an electric motor vehicle and said coolant cycle is adjacent to a battery of said electric motor vehicle such that the coolant cycle cools the battery.

11. A vehicle comprising:

a heating device for a heat-transfer agent in a heating system in the vehicle, said heat-transfer agent circulating in a coolant cycle and said coolant cycle including a heat exchanger for heating, said heating device including a plurality of heat conductive members being stacked and a plurality of channels through which the heat-transfer agent flows, the front sides of said stacked heat conductive members being closed with a cover in such a manner that said channels are connected to a communicating channel system, said plurality of heat conductive members being arranged closely adjacent to a heating element, said heating element being a PTC (Positive Temperature Coefficient) heating element.

12. A vehicle according to claim 11, wherein said heat conductive member is provided as an extruded profile.

13. A vehicle according to claim 11, wherein said PTC heating element comprises a plurality of PTC thermistors, said thermistors being arranged between plane-parallel metallic electrodes and being connected in parallel.

14. A vehicle according to claim 11, wherein a plurality of heat conductive members are arranged adjacently to each other, with a PTC heating element being arranged between each two heat conductive members.

15. A vehicle according to claim 11, wherein said heat-transfer agent has a temperature, and said heating device comprises control means for controlling the temperature of said heat-transfer agent, said control means being capable of individually turning on and off said PTC heating element.

16. A vehicle according to claim 11, wherein said PTC heating element is operable in a voltage range of 100V–400V, and produces a heat output of 800W.

17. A vehicle according to claim 11, wherein said cover consists of plastic.

18. A vehicle according to claim 11, further comprising a second cover, one of the two covers being provided with connecting fittings for supplying said heat-transfer agent, and the other cover being provided with an electrical terminal for supplying electric power to said PTC heating element.

19. A vehicle according to claim 11, wherein said heat exchanger heats a passenger compartment of said vehicle.

20. A vehicle according to claim 11, wherein said vehicle is an electric motor vehicle and said coolant cycle is adjacent to a battery of said electric motor vehicle such that the coolant cycle cools the battery.

* * * * *